Oct. 6, 1942.   L. A. BERGERON   2,297,868
MEANS FOR DETECTING AND INDICATING TEMPERATURE
Filed June 7, 1939   2 Sheets-Sheet 1
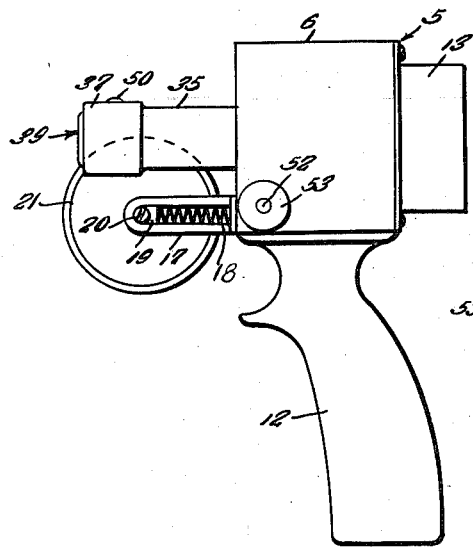
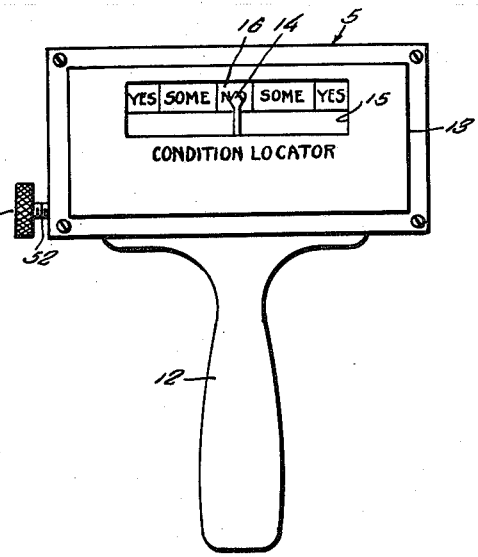
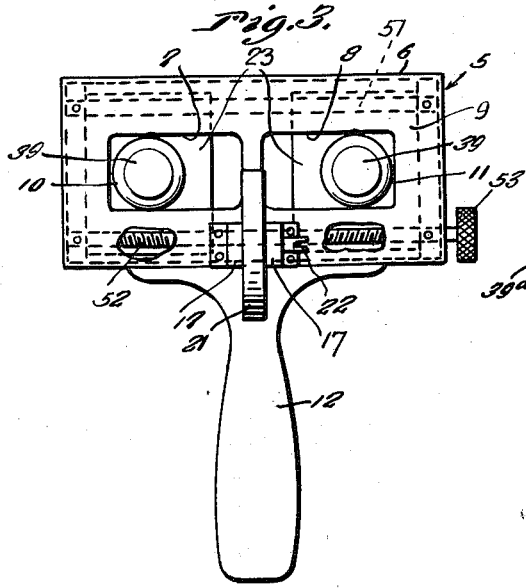
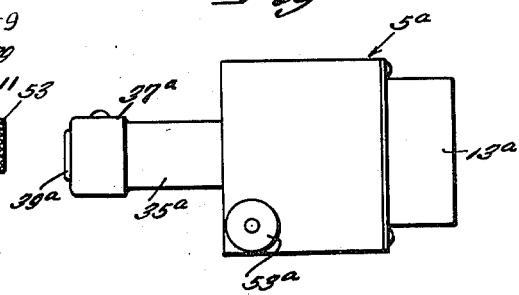
Inventor
L. A. Bergeron
By Clarence A. O'Brien
and Hyman Berman
Attorneys Oct. 6, 1942.   L. A. BERGERON   2,297,868
MEANS FOR DETECTING AND INDICATING TEMPERATURE
Filed June 7, 1939   2 Sheets-Sheet 2

Inventor
L. A. Bergeron

By Clarence A. O'Brien
and Hyman Berman
Attorneys

Patented Oct. 6, 1942

2,297,868

UNITED STATES PATENT OFFICE 2,297,868

MEANS FOR DETECTING AND INDICATING TEMPERATURE

Lauren Anatole Bergeron, Port Huron, Mich.

Application June 7, 1939, Serial No. 277,962

16 Claims. (Cl. 73—342)

My invention relates to electro-mechanical means for detecting and indicating temperature, and an important object of the invention is to provide an arrangement of the character indicated which has greater sensitivity, accuracy, and adjustability and which is adaptable to use with bodies of many different materials, including human and animal bodies and component elements thereof.

Other important objects and advantages of my invention will be apparent from a reading of the following description and the drawings wherein for purposes of illustration preferred embodiments of the invention are shown.

In the drawings:

Figure 1 is a left-hand side elevational view of the preferred embodiment.

Figure 2 is an elevational view of Figure 1 looking from right to left.

Figure 3 is an elevational view of the opposite side of Figure 2.

Figure 4 is a view similar to Figure 1 of another embodiment of the invention.

Figure 5 is an enlarged transverse vertical sectional view taken through either Figure 3 or Figure 4 through one of the probe mechanisms.

Figure 6 is a wiring diagram showing the electrical arrangements and connections involved in both embodiments of the invention.

Referring in detail to the drawings the numeral 5 generally designates the preferred embodiment shown in Figures 1, 2 and 3 of the drawings and consisting of a temperature differential determining device comprising a generally rectangular casing 6 having a pair of elongated rectangular openings 7 and 8, respectively in its rear wall 9 through which project the respective probes 10 and 11 for engaging with spaced points of the body to be tested. A handle 12 in the form of a pistol grip is secured to the bottom of the casing and the front of the casing is closed by a pan-shaped housing 13 which encloses a milliammeter, or condition locator in case of a chiropractic adaptation of the device, the pointer 14 of the milliammeter showing through a window 15 formed in the housing 13. The pointer normally stands at the middle of a "scale" 16 but when deflected by a temperature differential between the probes will stand more or less distant from the said middle, either to the left or to the right, according to which of the probes is absorbing the greater heat from the body being tested.

On the back of the casing 6 between the probes is a pair of brackets 17 each having a channel guideway in which works a coiled spring 18 which expands between the end of the brackets and the friction blocks 19 which bear against spaced portions of a stub axle 20 which is slidably journaled in the brackets 17 and has fixed thereto the rubber tired wheel 21 which is utilized to maintain steady contact particularly with the irregular surface of the body being tested while moving the device over the surface thereof, as in testing along the irregular contours of the human spine to ascertain the locations of vertebrae requiring adjustment. The stub axle 20 has a slotted adapter 22 on one end for connection with a flexible cable, such as a dental cable, so that the revolution of the wheel may be transferred to a suitable recording instrument (not shown).

The two probe mechanisms are similar in structure and arrangement and each comprises a metal housing including a rectangular mounting flange 23 which abuts the inner side of the casing wall 9 around the corresponding one of the openings 7, 8 and a cylindrical part 24 which extends forwardly from the mounting flange as shown in Figure 5. An internal stop flange 25 is located at the rear end of the bore 26 of the cylinder 24 and a dielectric material plate 27 closes the front end of the cylinder 24 and is removably secured in place by screws 28. An integral binding post lug 29 projects radially from the cylinder 24. The bore 26 of the cylinder 24 is lined with a dielectric cylinder 31 in which are arranged carbon disks 30 forming a carbon pile resistance which at one end engages a metal disk 32 which is in contact with the adjustable contact screw 33 which is threaded in the plate 27 and has connected thereto a binding post strip 34. Projecting rearwardly from the mounting flange 23 is the cylindrical bellows tube 35 which has a rear end portion enlarged in diameter as indicated by the numeral 36 and telescoped thereon in a cap 37 held in place by a set screw 50 engaging the portion 36. The cap 37 has an inturned flange 38 to retain the fabric washer 40. The washer 40 abuts the rear end of the insulating tube 41, and the front end of the tube 41 bears against the shoulder 42 defined at the juncture of the tube 35 and its enlarged portion 36. The said rear end of the insulating tube 41 is counterbored as indicated by the numeral 43 to accept and provide for limited axial movement of the radial flange 44 on the front end of the hollow metal contact tip 39 relative to the washer 40. The tip 39 is in the form of a metallic cylinder having a coating 45 of platinum on its exposed end for enhanced heat transmission purposes.

A rod 46 has a flat head 47 bearing against the carbon pile and a flat head 48 located in the vicinity of the shoulder 42 in the bellows tube 35 and on this rod is circumposed a helical spring 49 which is compressed between the internal flange 25 and the head 48. Between the head 48 and the contact tip 39 is connected a bellows 50' which is filled after evacuation with a suitable heat sensitive gas such as ethyl ether. The bellows is fastened both to the adjacent end of the contact tip 39 and to the head 48. Bellows and the tip are in communication by means of a hole 45' in the front end of the tip so that the heat sensitive gas fills both the bellows and the interior of the contact tip 39 at a predetermined pressure.

The probes are slidably carried on a smooth rod 51 mounted in the upper part of the casing 6 and on a threaded rod 52 mounted in the lower part of the casing 6, both rods traversing corresponding portions of mounting flanges 23. The rod 52 has oppositely threaded portions threaded in the mounting flanges of the respective probes. A handle 53 enables rotating the rod 52 to adjust the probes laterally toward and away from each other to vary the distance between the contact tips 39 in accordance with the requirements of the work at hand, while at the same time maintaining the tips with their axes parallel and with their platinum coated surfaces in the same or parallel planes.

Referring to Figure 6, the electrical circuit comprises an ordinary Wheatstone bridge circuit including the two carbon piles 30 in adjacent arms thereof with one terminal of an ordinary dry cell battery 54 connected therebetween and the remaining terminal of the battery connected between the remaining two arms each containing a fixed resistance 55. The numeral 56 generally designates a suitable conventional pen recorder which is operated by the circuit and has the terminals thereof connected, respectively, to the terminals of the variable resistance 57 and to the leads 58 and 59 from the terminals of the milliammeter or "condition locator" 13, to the points 60 and 61, respectively, of the Wheatstone bridge.

When the heat of the spot of the body engaged by the contact tip 39 of one of the probes is greater than that engaged by the contact tip 39 of other probe, a correspondingly greater expansion of the gas in the related bellows takes place and this produces proportionately greater compacting of the corresponding carbon pile 30, thereby reducing the resistance of the carbon pile and unbalancing the corresponding arm of the Wheatstone bridge, so that the pen recorder is caused to record to the left or to the right, as the case may be, to a corresponding degree, as will the pointer 14 of the milliammeter 13.

The adjustable contact screws 33 are utilized to balance the action of the carbon piles relative to each other so that the action of the probes under similar temperatures will be even and the same in electrical effect.

In the embodiment of the invention shown in Figures 4 and 5, exhibiting a single probe or heat sensitive element especially adapted to the testing of materials, the arrangements are similar to those described above except that the handle 12, the brackets 17, the milliammeter 13, and the wheel 21 are absent, thereby providing a form of the invention better adapted to general use for detection and indication of locations having a higher than normal temperature and the consequent operation or control of selected electrical circuits or devices.

Although I have shown and described herein preferred embodiments of my invention, it is to be definitely understood that I do not desire to limit the application of the invention thereto except as may be required by the scope of the subjoined claims.

Having described the invention, what is claimed as new is:

1. A device of the character described comprising a support, a pair of probes having heat responsive elements having contact surfaces, means mounting said probes on said support to maintain said contact surfaces in parallel planes, means for adjusting said probes toward and away from each other while retaining the parallel relationships of said contact surfaces.

2. A device of the character described comprising a support, a pair of probes having heat responsive elements having contact surfaces lying in parallel planes, means mounting said probes on said support for adjustment toward and away from each other to vary the lateral spacing of said contact surfaces without disturbing their parallel relationships, a roller located between said heat responsive elements, yieldable spring pressed means mounting said roller on said support and positioning the surface of said roller to contact the work in advance of said contact surfaces, said roller being arranged to yield to allow said contact surfaces to engage the work.

3. A device of the character described, said device comprising a support, a pair of probes having heat responsive elements having contact surfaces lying in parallel planes, means mounting said probes on said support for adjustment toward and away from each other without disturbing the parallel relation of said contact surfaces, a handle on said support, said handle projecting from said support approximately parallel to the planes of the contact surfaces for holding the contact surfaces in engagement with the surface of the body being tested.

4. In a device of the character described, a support, probes on said support, each probe comprising a housing including an insulated carbon pile chamber having a carbon pile therein, a bellows, a heat sensitive expansible gas in said bellows, an operative connection between said bellows and said carbon pile whereby expansion of said bellows exerts pressure on said carbon pile so as to increase the electrical conductivity of said carbon pile, and a heat absorbing tip for engagement with the surface of the body to be tested, said tip being in heat conductive relation to said bellows and the expansible gas therein.

5. In a device of the character described, a support having a pair of heat sensitive probes thereon, each of said probes comprising a housing, a carbon pile and a bellows in said housing, an expansible gas filling said bellows, means operatively connecting said bellows with said carbon pile to exert pressure on said carbon pile when the bellows expands due to expansion of the gas therein so as to increase the conductivity of said carbon pile, a heat absorbing and transmitting tip connected to said bellows to absorb and transmit heat from the body contacted to the bellows and the expansible gas therein, means supporting said probes on said support in laterally spaced relation, a Wheatstone bridge circuit including the carbon piles in adjacent arms thereof, and visual indicating means operated by said Wheatstone bridge circuit.

6. A heat sensitive device comprising a support, at least one heat sensitive probe thereon, each probe comprising a housing comprising an insulated carbon pile chamber having a carbon pile therein, and a bellows chamber having an expansible bellows therein, said bellows being filled with an expansible gas, said carbon pile and said bellows being substantially axially aligned, rigid means operatively positioned between the adjacent ends of the bellows and carbon pile to transmit expansion of said bellows to said carbon pile for compressing the same and thereby increase the electrical conductivity of said carbon pile, a heat absorbing and transmitting tip slidably mounted in said housing and connected in heat transfer relation to said bellows, said tip having a contact surface for engagement with the surface of the body to be tested.

7. In a heat sensitive device, a support, a heat sensitive element mounted on said support, said element comprising heat absorbing and transmitting tip having a contact surface for engagement with the surface of the body to be tested, a bellows connected in communication with said hollow tip, an expansible gas filling said bellows and said tip, a carbon pile, means operatively connecting said bellows with said carbon pile whereby expansion of said bellows compresses said carbon pile to increase the conductivity of said carbon pile.

8. A heat sensitive device comprising a support, a pair of axially elongated probes projecting parallelly from said support, means mounting said probes on said support for movement toward and away from each other without disturbing their parallelism, each probe having an axially movable heat sensitive tip having a contact surface to engage the surface of the work to be tested.

9. A heat sensitive device comprising a support, a pair of axially elongated probes projecting parallelly from said support, means mounting said probes on said support for movement toward and away from each other without disturbing their parallelism, each probe having an axially movable heat sensitive tip having a contact surface to engage the surface of the work to be tested, the contact surfaces of said contact tips being arranged in substantially parallel planes and being substantially plane in contour.

10. A heat sensitive device comprising a support, a pair of probes mounted on said support for rectilinear movement toward and away from each other, adjusting means for adjusting the spacing of said probes, each of said probes comprising a housing comprising an insulated chamber containing a carbon pile, a second chamber containing a bellows containing an expansible gas, operating means effective to transfer the expansion of said bellows to said carbon pile to compress and increase the electrical conductivity of said carbon pile, and a heat absorbing and transmitting tip movably mounted to project from said housing for engagement with the surface of the body to be tested, said tip being connected to said bellows in heat transfer relation thereto.

11. A heat sensitive device according to claim 10 wherein bellows is movably contained in said housing and spring means is arranged to yieldably resist movement of said bellows as a whole in a direction for imparting effective motion to said operating means.

12. A heat sensitive probe according to claim 10 wherein said tip and said bellows are movably contained in said housing together with spring means arranged to yieldably resist movement of said tip and said bellows in a direction for imparting effective motion to said operating means.

13. A heat sensitive probe according to claim 10 wherein said tip and said bellows are movably contained in said housing together with spring means arranged to yieldably resist movement of said tip and said bellows in a direction for imparting effective motion to said operating means, the tips and bellows of said pair of probes being unconnected with each other whereby said tips and bellows are free for independent accommodation to the surface of the body to be tested.

14. A heat sensitive probe according to claim 10 wherein said tip and said bellows are movably contained in said housing together with spring means arranged to yieldingly resist movement of said tip and said bellows in a direction for imparting effective motion to said operating means, the tips and bellows of said pair of probes being unconnected with each other whereby said tips and bellows are free for independent accommodation to the surface of the body to be tested, the tips and bellows being substantially axially aligned with the tips having plane contact surfaces arranged in parallel planes extending at right angles to the axes of the tips, said probes being mounted on said support in a manner producing constant parallelism of the tips in all spaced adjustments of the probes.

15. A device of the character described, said device comprising a portable casing including a pistol-grip handle, a visible indicator on the rear of the casing, a pair of laterally spaced heat sensitive probes projecting forwardly from the casing, and electrical means within said casing and connected in circuit with said probes and said indicator, said electrical means being operative upon application of the probes to the surface of a body to be tested to cause said indicator to show the temperature differential between the two points on the surface of the body contacted by said probes, and a forwardly spring pressed roller mounted on said casing between the probes to engage the surface of the body to be tested in advance of the tips of the probes and maintain contact with such body during the application of the tips to the body.

16. A device of the character described, said device comprising a portable casing including a pistol grip handle, a visible indicator on the rear of the casing, a pair of laterally spaced heat sensitive probes projecting forwardly from the casing, and electrical means within said casing and connected in circuit with said probes and said indicator, said electrical means being operative upon application of the probes to the surface of a body to be tested to cause said indicator to show the temperature differential between the two points on the surface of the body contacted by said probes, said probes being mounted in said casing for lateral adjustment relative to each other to vary the lateral spacing of the probes, said probes having heat sensitive tips having plane contact surfaces arranged in parallel planes, and means mounting said probes in said casing whereby constant parallelism of the contact surfaces of said tips is maintained throughout the range of lateral adjustment of the probes.

LAUREN ANATOLE BERGERON.